(12) United States Patent
Gupta et al.

(10) Patent No.: US 8,331,548 B2
(45) Date of Patent: *Dec. 11, 2012

(54) SYSTEMS AND METHODS FOR DATA SYNCHRONIZATION IN A CUSTOMER CENTER

(75) Inventors: Rajan Gupta, Alpharetta, GA (US); Kurt Rush, Woodstock, GA (US); Uri Peleg, Santa Clara, CA (US)

(73) Assignee: Verint Americas, Inc., Roswell, GA (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/891,620

(22) Filed: Sep. 27, 2010

(65) Prior Publication Data

US 2011/0038475 A1    Feb. 17, 2011

Related U.S. Application Data

(63) Continuation of application No. 11/529,942, filed on Sep. 29, 2006, now Pat. No. 7,817,795.

(60) Provisional application No. 60/799,228, filed on May 10, 2006.

(51) Int. Cl.
*H04M 3/00* (2006.01)

(52) U.S. Cl. .............................. 379/265.04; 379/265.03

(58) Field of Classification Search ............... 379/265.1, 379/265.04, 265.06
See application file for complete search history.

(56) References Cited

U.S. PATENT DOCUMENTS

| | | | | |
|---|---|---|---|---|
| 4,684,349 A | * | 8/1987 | Ferguson et al. | 434/308 |
| 4,694,483 A | * | 9/1987 | Cheung | 379/265.06 |
| 4,763,353 A | * | 8/1988 | Canale et al. | 379/157 |
| 4,815,120 A | * | 3/1989 | Kosich | 379/32.04 |

* cited by examiner

*Primary Examiner* — Creighton Smith
(74) *Attorney, Agent, or Firm* — Meunier Carlin & Curfman (57) ABSTRACT

A synchronization manager comprises an instruction execution system. The instruction execution system is configured to identify an initial master application of a plurality of workforce applications that are in communication with a contact center, identify remaining ones of the workforce applications as slave applications, determine a substitute master application hierarchy by prioritizing the slave applications, monitor the initial master application to detect changes to user data, and if changes to the user data in the initial master application are detected, update corresponding user data in the slave applications with the changes to the user data in the initial master application. The instruction execution system is further configured to, if the initial master application is unavailable, identify one of the slave applications as a substitute master application based on the prioritization of the slave applications in the substitute master application hierarchy, and monitor the substitute master application to detect changes to the user data.

18 Claims, 11 Drawing Sheets

SYSTEMS AND METHODS FOR DATA SYNCHRONIZATION IN A CUSTOMER CENTER

CROSS-REFERENCE TO RELATED APPLICATIONS

This application is a continuation of copending U.S. utility application entitled "Systems and Methods for Data Synchronization in a Customer Center" having Ser. No. 11/529,942 and filed on Sep. 29, 2006, which in turn claims the benefit of U.S. provisional application entitled "Systems and Methods for an Integrated Workforce Optimization Database" having Ser. No. 60/799,228 and filed on May 10, 2006, all of which is entirely incorporated herein by reference.

TECHNICAL FIELD

The present disclosure is generally related to management of information related to employees of customer centers.

BACKGROUND

Customer centers typically have various types of agents who handle various tasks. Many agents are trained and have many responsibilities in various departments of the customer centers. For example, a particular agent can handle billings as well as shipping. Each department typically maintains information related to its agents. However, despite agents being able to work in multiple departments, intra-departmental access to agent information typically is not provided. Such information includes, but is not limited to, the agents' home addresses, telephone numbers, schedules, and training, for example. Additionally, when agent information is changed in one department, corresponding information is not changed in other departments.

SUMMARY

Systems and methods to synchronize data in a contact center having a plurality of users are disclosed herein. In this regard, a representative method comprises identifying an initial master application of a plurality of workforce applications that are in communication with the contact center, identifying remaining ones of the workforce applications as slave applications, determining a substitute master application hierarchy by prioritizing the slave applications, monitoring the initial master application to detect changes to user data, and if changes to the user data in the initial master application are detected, updating corresponding user data in the slave applications with the changes to the user data in the initial master application. The method further comprises, if the initial master application is unavailable, identifying one of the slave applications as a substitute master application based on the prioritization of the slave applications in the substitute master application hierarchy and monitoring the substitute master application to detect changes to the user data, and if changes to the user data in the substitute master application are detected, updating corresponding user data in the slave applications with the changes to the user data in the substitute master application. In addition, agent synchronization login functionality among multiple applications is provided.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications and equivalents.

DETAILED DESCRIPTION

Disclosed herein are systems and methods for performing agent data synchronization in a customer center. Exemplary systems are first discussed with reference to the figures. Although these systems are described in detail, they are provided for purposes of illustration only and various modifications are feasible. After exemplary systems have been described, examples of display diagrams and operations are provided to explain the manner in which processes for performing agent data synchronization in a customer center can be achieved.

A customer center can include, by way example, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, enterprise reporting systems, payroll systems, and speech analytics, for example.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Figure 1:
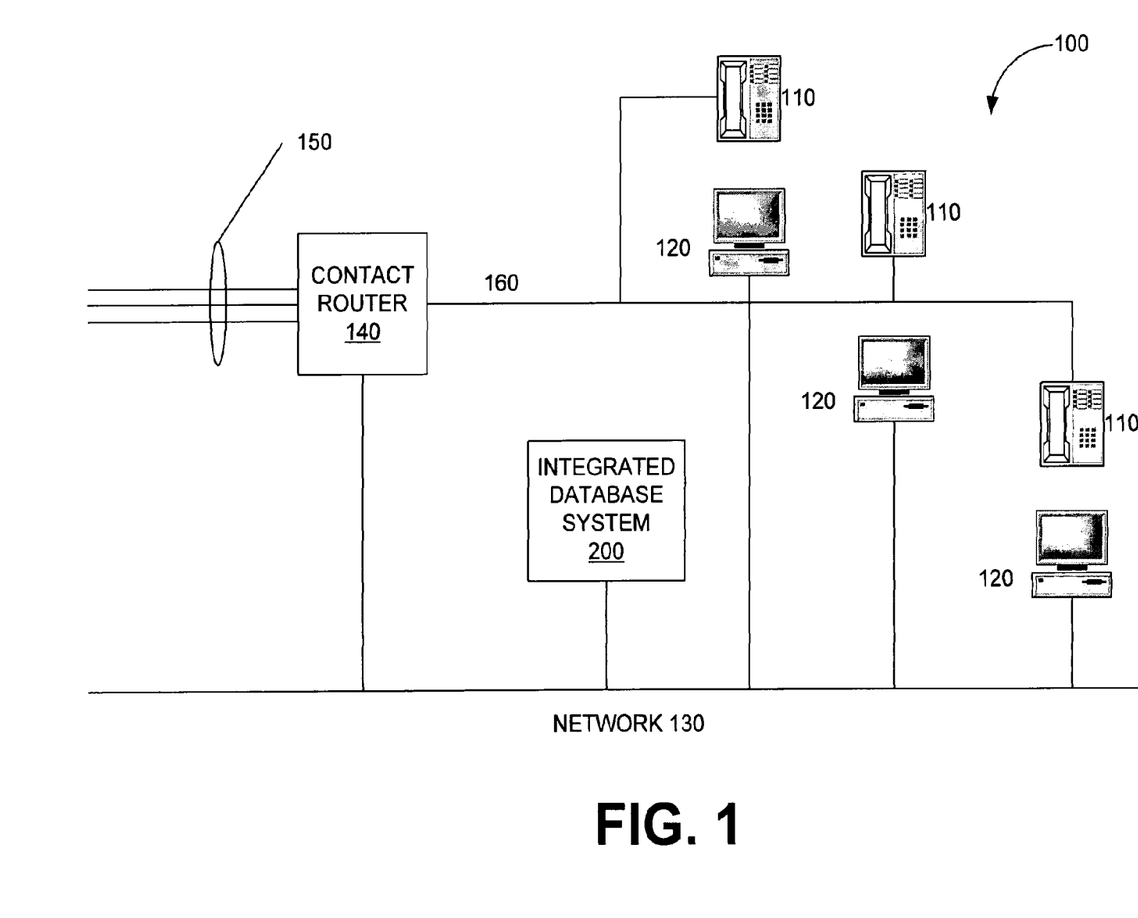
FIG. 1 is a schematic diagram illustrating a customer center environment containing an embodiment of an integrated database system.

Referring now in more detail to the figures, FIG. 1 illustrates an embodiment of a customer center environment 100. The customer center 100 is staffed by agents who handle incoming and/or outgoing contacts. Although the traditional and most common form of contact is by phone, other types of contacts are becoming more common (e.g., text chat, web collaboration, email, and fax). An agent workspace includes an agent phone 110 and a workstation computer 120. A network 130 connects one or more of the workstations 120.

A contact router 140 distributes incoming contacts to available agents. For example, when the contacts are made by traditional phone lines, the contact router 140 operates by connecting outside trunk lines 150 to agent trunk lines 160. In this environment, the contact router 140 may be implemented by an automatic call distributor (ACD), which queues calls until a suitable agent is available. Other types of contacts, such as Voice over Internet Protocol (VoIP) calls and computer-based contacts (e.g., chat and email) are routed over one or more data networks. These contacts are distributed over network 130 to one of the agent workstations 120.

Figure 2:
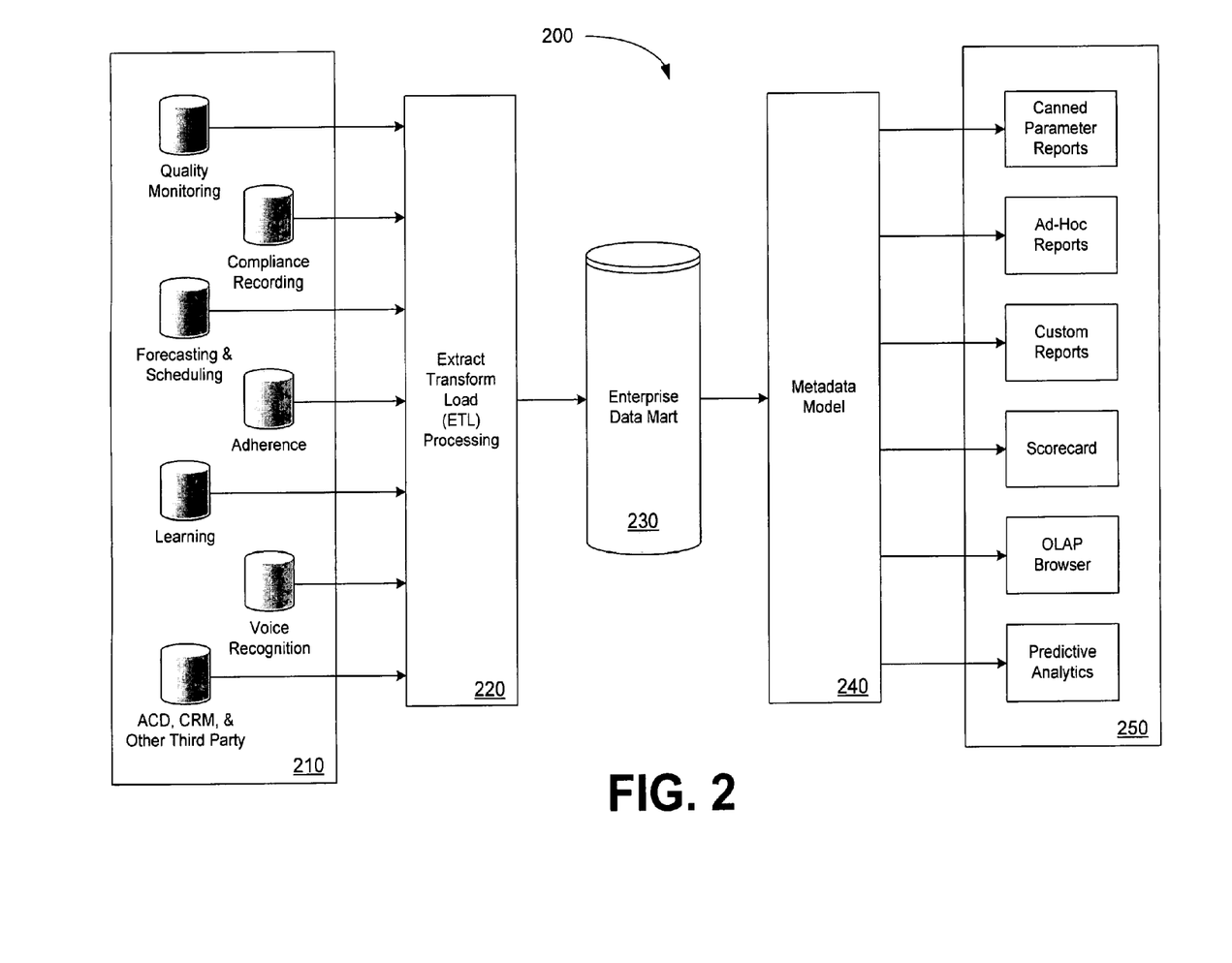
FIG. 2 is a diagram illustrating an embodiment of an integrated database system in a customer center environment.

FIG. 2 illustrates the embodiment of the integrated database system 200 in the customer center environment 100. As shown in FIG. 2, a data source 210 is provided by an assortment of different agent workforce related applications. The functionality of the data source is typically divided among the agent workforce related applications, executables, processes or services, including quality monitoring, forecasting and scheduling, compliance recording, adherence, learning, voice recognition, ACD, CRM (customer relationship management) and/or other third party applications, among others. Typical use of the agent workforce related applications results in data being provided to one or more databases. Extract transform load (ETL) processing 220 moves the data, transforms the data, and provides the data in different schema and formats in an enterprise data mart 230. A metadata model 240 provides structure on top of the relational database schema for applications 250 to use. The applications 250 may access the data to provide parameter reports, ad-hoc reports, custom reports, scorecards, an on line analytical processing (OLAP) browser, and predictive analytics, among others.

Figure 3:
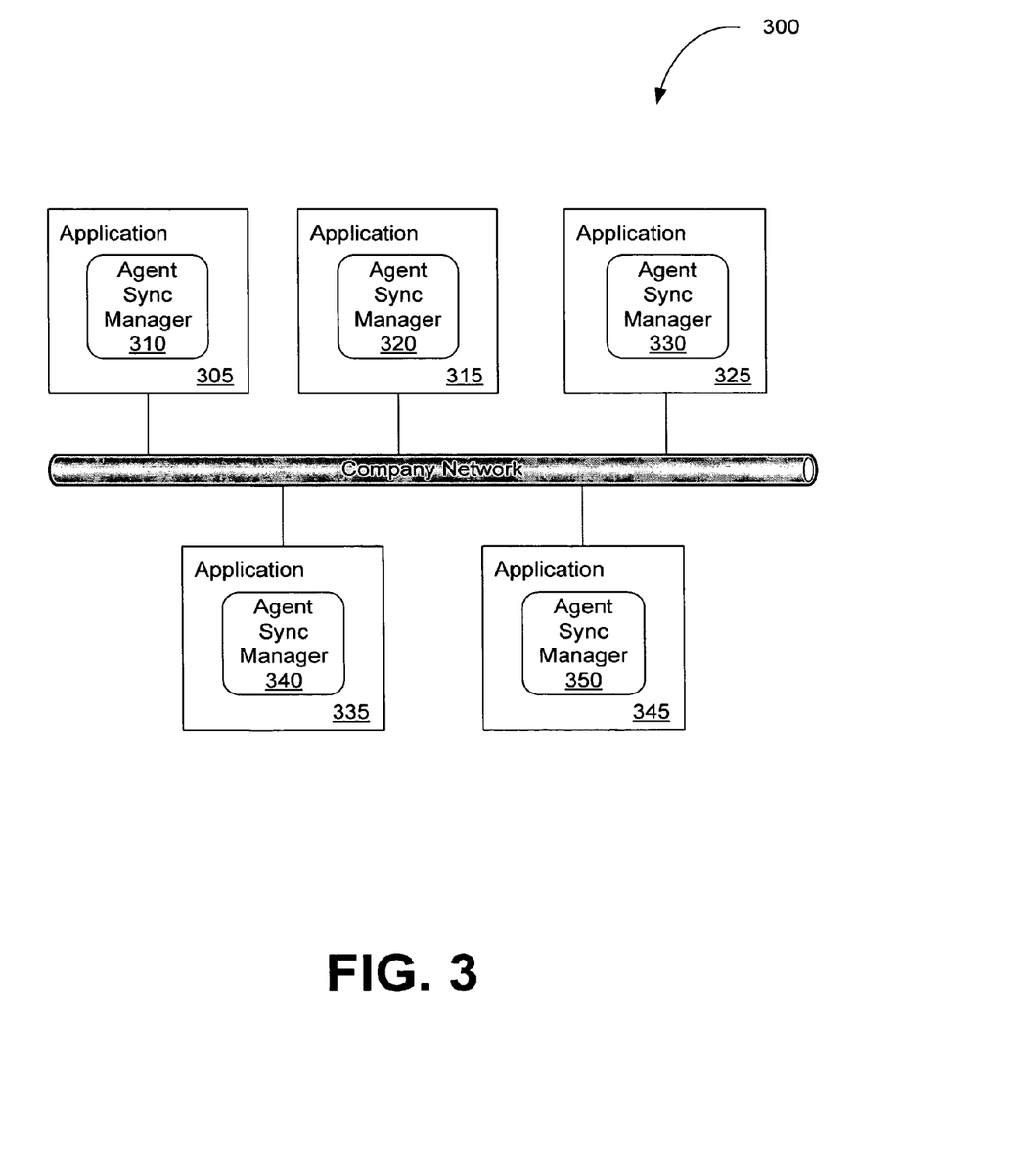
FIG. 3 is a diagram illustrating an embodiment of a customer center network for providing agent synchronization among software applications at a data source.

FIG. 3 is a diagram illustrating an embodiment of a customer center network for providing agent synchronization among software applications at a data source, such as that shown in FIG. 2. Customer center agents operate particular applications 305, 315, 325, 335, 345, which can be, but not limited to, quality monitoring and compliance recording of a data source. Each customer center agent can utilize more than one application.

For a customer center agent to utilize other applications seamlessly, customer center agent data are replicated from a file onto an application layer of each application 305, 315, 325, 335, 345 and utilized in those other applications. The file includes information of the agents and is generally handled by an agent synchronization manager 310, 320, 330, 340, 350 of its respective application 305, 315, 325, 335, 345. However, it should be noted that the file can be synchronized and stored in other systems (not shown) of the customer center. Alternatively or additionally, the agent data can be synchronized among the software applications using by way of example, but not limited to, web service, Representation State Transfer (REST), database, and socket.

Each application receives and synchronizes at least a portion of the agent information from the file. For example, the quality monitoring application can receive certain information of the agents from the file and update its data about the agents on the application layer according to the received agent information. Alternatively or additionally, the quality monitoring application can receive substantially all of the information of the agents from the file and select relevant information of the agents to update its data.

The agent information can be changed in the file by, for example, an administrator of the customer center. The agent information having the changed data is exported to an application, such as quality monitoring, compliance recording, and adherence of data source. The agent data can then be pushed to the application.

The data in the file includes a unique identification that enables each application to identify the data and associate the data with an agent. Upon synchronization and updating of the agent information, the file can be updated between the applications. The agent synchronization manager 310, 320, 330, 340, 350 monitors the file having the agent information. Upon detecting a change in the agent information, the agent information is imported and updated for the applications. Data for multiple customer center agents can be monitored and/or updated simultaneously.

Alternatively or additionally, the agent information may be updated incrementally such as with full snapshot data pushes in order to keep the agent data in sync among the various applications. A full snapshot data push, which involves sending the entire agent data in the agent file to the software applications, occurs when data is sent to the application even though the application has not yet detected a change.

Alternatively or additionally, one of the representative applications 330, 315, 325, 335, 345, among others, can operate as a master while the remaining applications can operate as slaves. Any application can function as the master. For example, WFM can be a master application while quality management (QM) can be a slave application.

A master application can push out one-time updates to set up the system and the slave applications. Alternatively or additionally, incremental updates can be sent as necessary. For example, a new agent joining the center may necessitate an update. If a new agent is added to the system, then that agent may be added to the master and/or slave applications, and then updates can be sent. Any changes to a particular agent may cause data to be pushed out to the other applications. Deleting an agent also may cause data to be pushed out. Additionally, a change in the agent-to-supervisor relationship, such as, for example, assigning an agent to a different supervisor, may cause data to be pushed out.

Agent synchronization allows for the synchronization of users across applications where one of the applications is designated as a master. Any of the slave applications can be designated a master application to replace a previous master application due to desired changes or due to the preferred master application not being available. For example, a hierarchy of master applications can be predetermined; WFM may be a master application, but if WFM were not present, then QM may, for example, be the master application; if QM were not present then enterprise reporting (ER) may become the master, etc. The master application can change with other desired circumstances.

Agent synchronization further allows for user management across disparate applications. Typically each application has its own individual data sources along with the agent synchronization manager. In such an environment, individual users need to log in separately, which in turn causes difficulties in maintaining consistent user information. With agent synchronization, user information may be managed across multiple applications at a customer center system.

The agent of the customer center can log into the application. Should the customer center agent desire to utilize another application such as enterprise reporting application 370, then the user can be signed-on to that application. Single sign-on capability eliminates the need for users to endlessly sign-on to other applications as the need arises. Agent synchronization and single sign-on allow users to login once to any of the applications without having to sign on again to other applications. With agent data managed throughout the customer center and pushed out to the other applications, the users can login to one application, open another application and then have automatic authentication.

Figure 4:
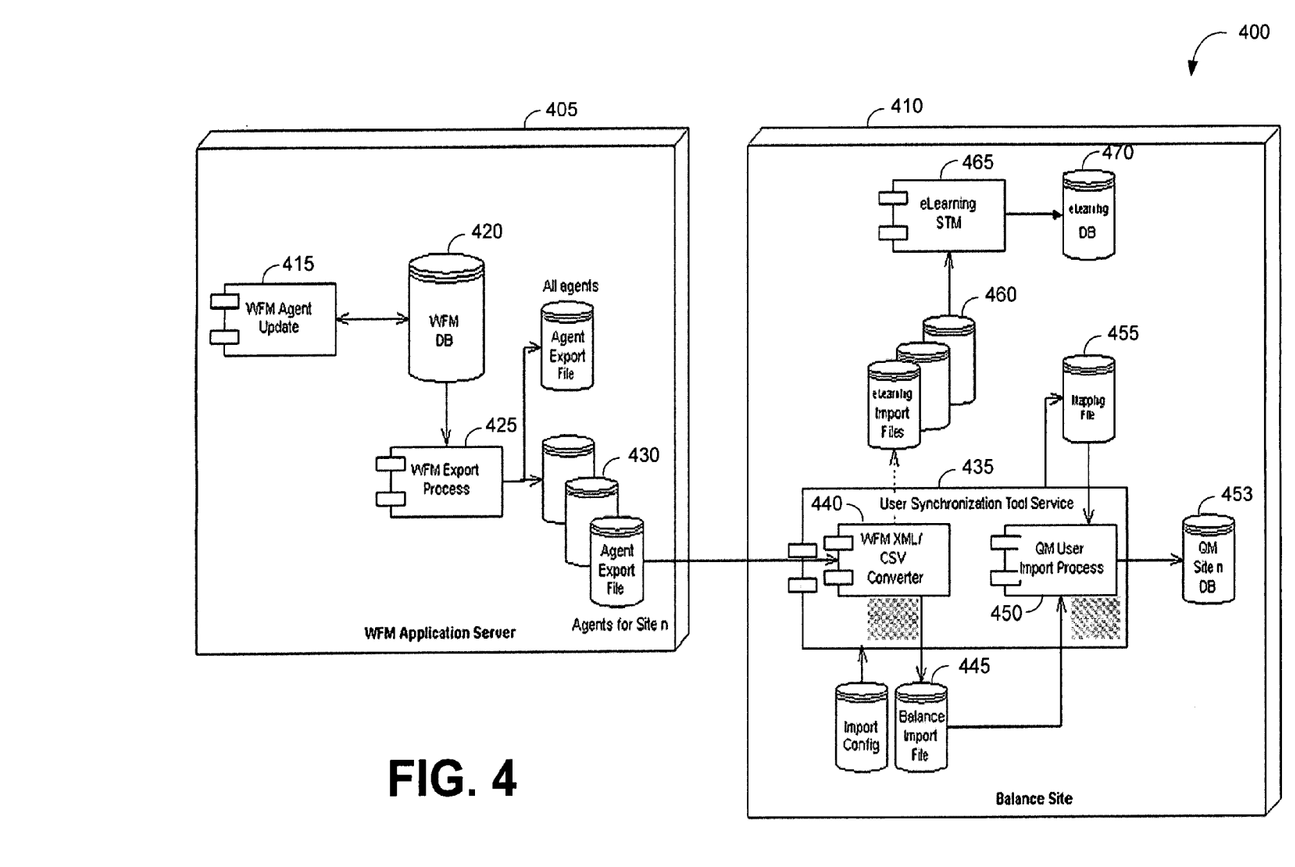
FIG. 4 is a schematic diagram illustrating an embodiment for providing agent synchronization from a work force manager (WFM) to a quality monitoring system.

FIG. 4 is a schematic diagram illustrating an exemplary embodiment for providing agent synchronization from WFM to quality monitoring. As shown in FIG. 4, the system 400 includes a WFM application server 405 and balance site 410. The WFM server 405 includes a WFM agent update manager 415, which enables a user to assign agents to, for example, quality monitoring applications, within the system 400. In addition, the WFM agent update manager 415 is operative to change the agent information, such as contact information, work schedule, work load, skill sets, etc.

The agent information is then transmitted to a WFM database 420, which is then transmitted via a WFM export process 425. The WFM export process 425 exports agent information in, for example, an eXtensible Markup Language (XML) format on a site by site basis (one file per site) and stores the agent information as an agent export file 430. XML is a subset of standard generalized mark up language (SGML) constituting a particular text mark up language for interchange of structured data. The agent export file 430 can then be sent to a balance site 410, which the agent export file 430 is received by a user synchronization tool service (USTS) 435.

The USTS 435 executes a WFM XML/CSV converter 440. The converter 440 transforms the agent export file 430 from an XML format to a balance import file 445. The WFM XML/CSV converter can also convert agent data in a commas separated value (CSV) format. The import file 445 is transmitted to a QM user import process 450, which loads the import file 445 containing the agent information into a QM site database 453. It should be noted that although the USTS 435 is shown to include the QM user import process 450, the QM user import process 450 can be implemented as a separate service from USTS 435.

The converter 440 can further transmit the export file 430 to an e-learning import file 460, which then transmits the import file 460 to an e-learning schedule task manager (STM) 465. The STM 465 is a scheduling utility used by e-learning to schedule e-learning related tasks. The e-learning STM 465 transmits the agent information into an e-learning database 470 using, for example, a scheduled STM task.

Alternatively or additionally, mapping file 455 can be used to describe the fields that appear in the CSV file, the order of the fields in each line of the CSV file, and maps those fields to the QM database fields. The mapping file 455 is used by the QM user import utility to determine which fields in QM site database 453 to update during the import.

Alternatively or additionally, the system can update all agent data in quality monitoring or e-learning from WFM. For example, WFM 405 exports all the agent data into an XML file. The USTS 435 detects the new file and starts its import process. The user synchronization tool service 435 converts the XML file into the CSV format for e-learning or quality monitoring. Agent information of a new agent is included in the databases 453, 470. The agent information should not be duplicated in each of the databases since each agent file has a unique identification.

Alternatively or additionally, WFM 405 can export agent information that has changed since the last update. For example, WFM 405 exports the agent information that has been changed, deleted/terminated, or newly added into an XML file. The USTS 435 converts the XML file into the CSV format for the e-learning and quality monitoring. The databases 453, 470 are updated with the agent information that has been changed, deleted/terminated, or newly added.

Figure 5:
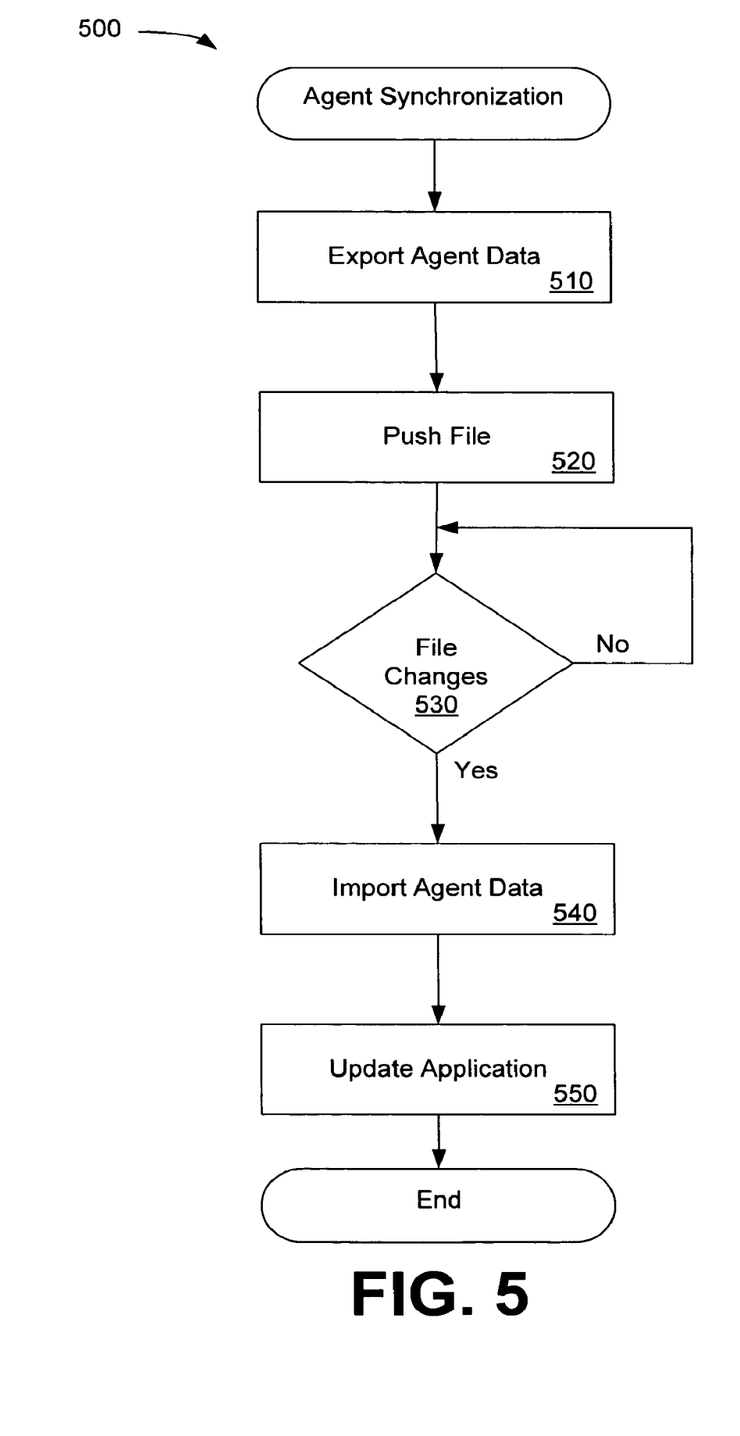
FIG. 5 is a flowchart illustrating an exemplary process for performing agent synchronization.

FIG. 5 is a flowchart 500 illustrating an exemplary process for performing agent synchronization. In this regard, agent data is exported to an agent file as shown in step 510. It should be noted that synchronization may include agent or user data, organizational hierarchy, personnel hierarchy and/or groups, among others. Upon exporting the agent data, the agent file is pushed to any appropriate applications in step 520. The applications monitor for changes to agent data in the agent file at step 5430. If there are no changes, the monitoring continues. Response to a change in the agent data, an application imports the agent data from the agent file at step 540. After importing the agent data, the agent file stored in the application is updated according to the new information at step 5450.

Figure 6:
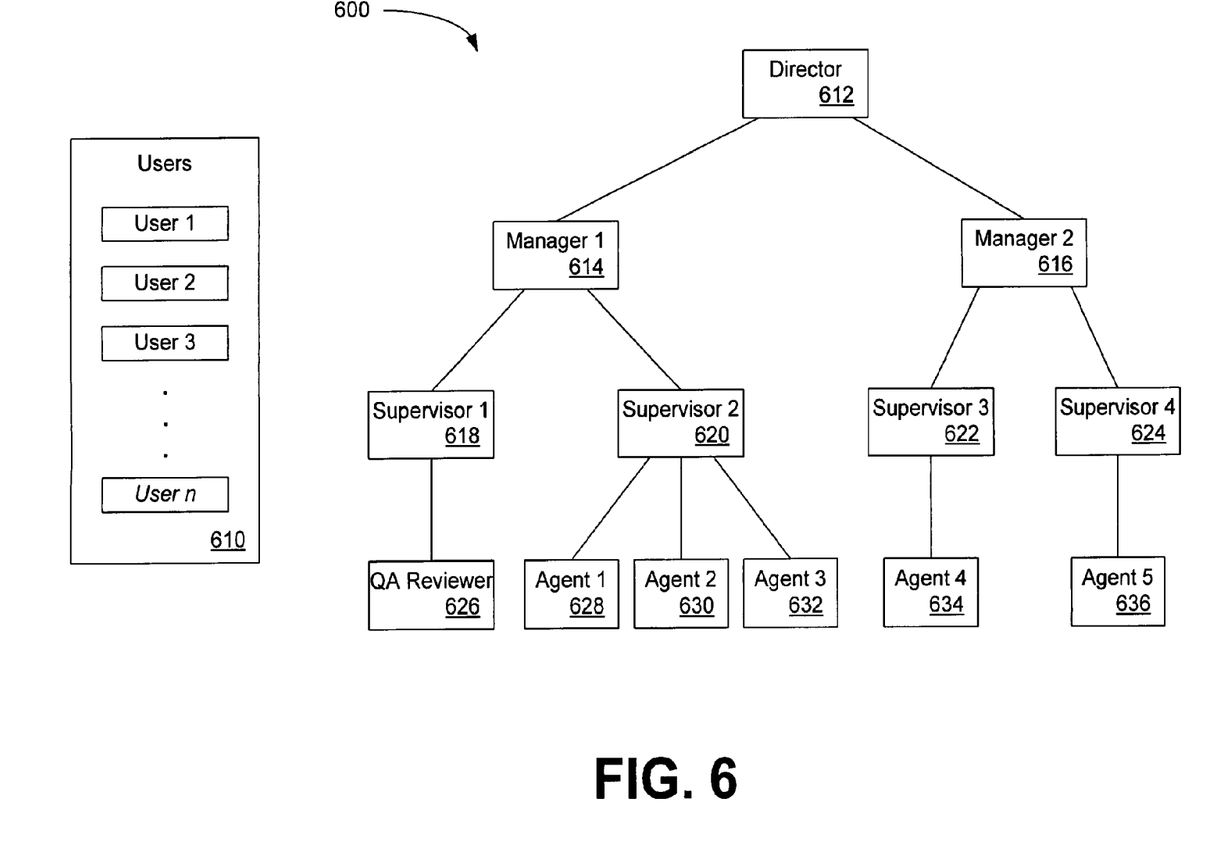
FIG. 6 is an exemplary personnel hierarchy in which agent information can be synchronized in a customer center network.

FIG. 6 is an exemplary personnel hierarchy in which agent information can be synchronized in a customer center network. The personnel hierarchy 600 contains multiple agents 628, 630, 632, 634, 636, in addition to supervisors 618, 620, 622, 624, managers 614, 616, a QA reviewer 626 and a director 612. Multiple users 610 are synchronized within the personnel hierarchy 600 and make up the customer center personnel. The personnel hierarchy 600 shows which agents work for which supervisors, which supervisors work for which managers, and which managers work for which directors, for example. As an example, agent 2 works for supervisor 2, while agent 4 works for supervisor 3, etc. The personnel hierarchy 600 is replicated into each of the applications. The list of users is not hierarchical, but each user is synchronized within the personnel hierarchy 600.

Each of the applications requires a different way of representing the users based on the functionality provided. For example, in quality management, customer center agents may not necessarily report to a quality reviewer, even though the quality reviewer may be reviewing the calls. In WFM, the supervisor and customer center agent may involve more of a reporting relationship. Each of the applications can also have different organizational requirements, and the disparate requirements can be accommodated through synchronization such that the needs of the applications are satisfied, while administering any user from a central location.

Figure 7:
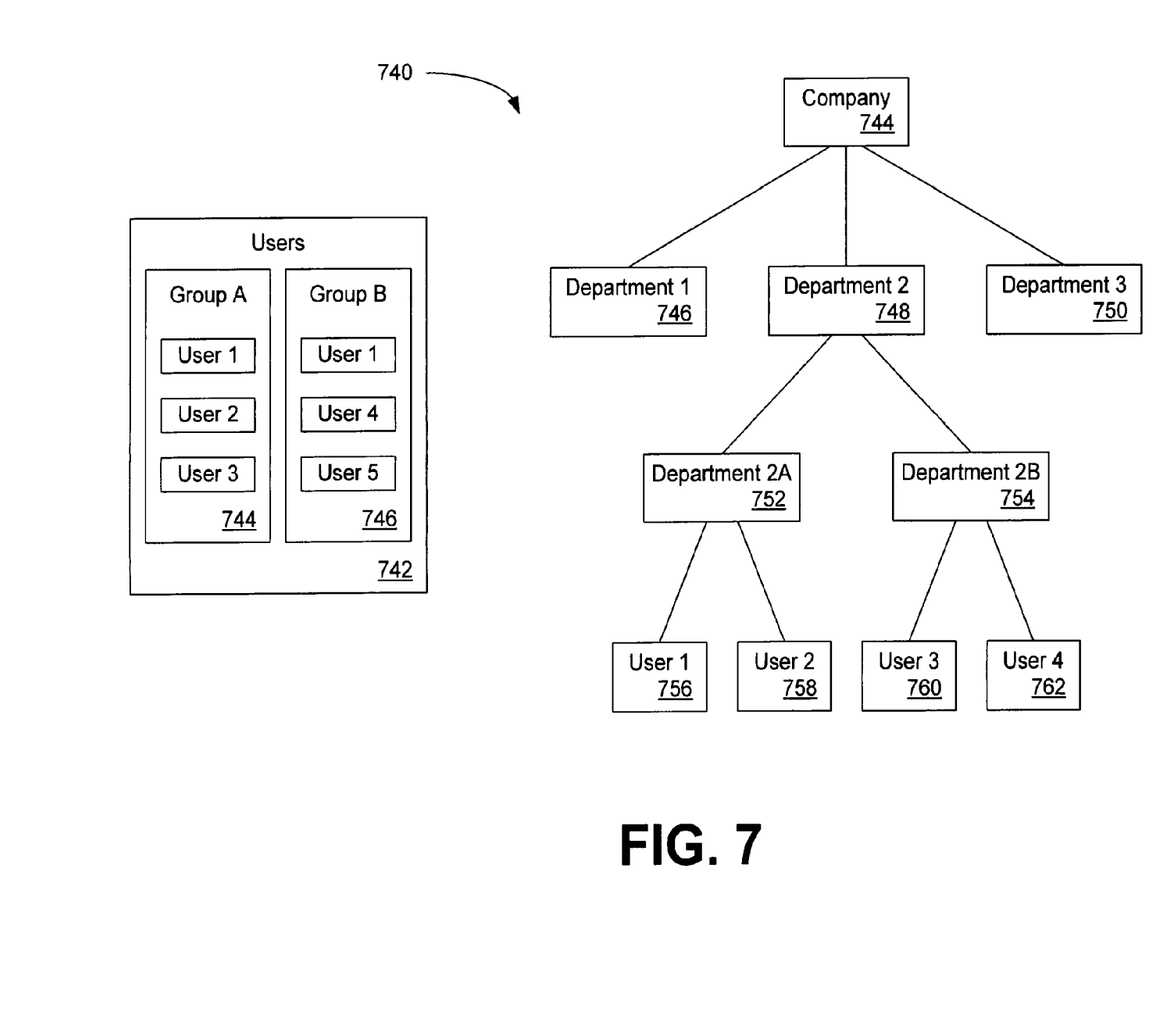
FIG. 7 is an exemplary organization hierarchy in which agent information can be synchronized in a customer center network.

FIG. 7 illustrates an exemplary organizational hierarchy 740. The organizational hierarchy 740 includes a company 744, and multiple departments 746, 748, 750. The department 748 contains more departments 752, 754, and finally users 756, 758, 760, 762, respectively. Multiple users 742 are part of at least one group such as Group A 744, or Group B 746. For example, User 1 is a part of Group A 744, as well as Group B 746, and is a member of department 2A 752. Users or groups of users may be common among various departments within an organization.

Additionally, users may be common among multiple groups and multiple applications. While FIG. 6 illustrates personnel hierarchy and FIG. 7 illustrates organizational hierarchy, it should be noted that synchronization may also occur within groups and applications. Thus, agent synchronization allows for the synchronization of personnel, organizations, groups and/or application users. Once the hierarchy is entered in one application, it is available for other applications.

Figure 8:
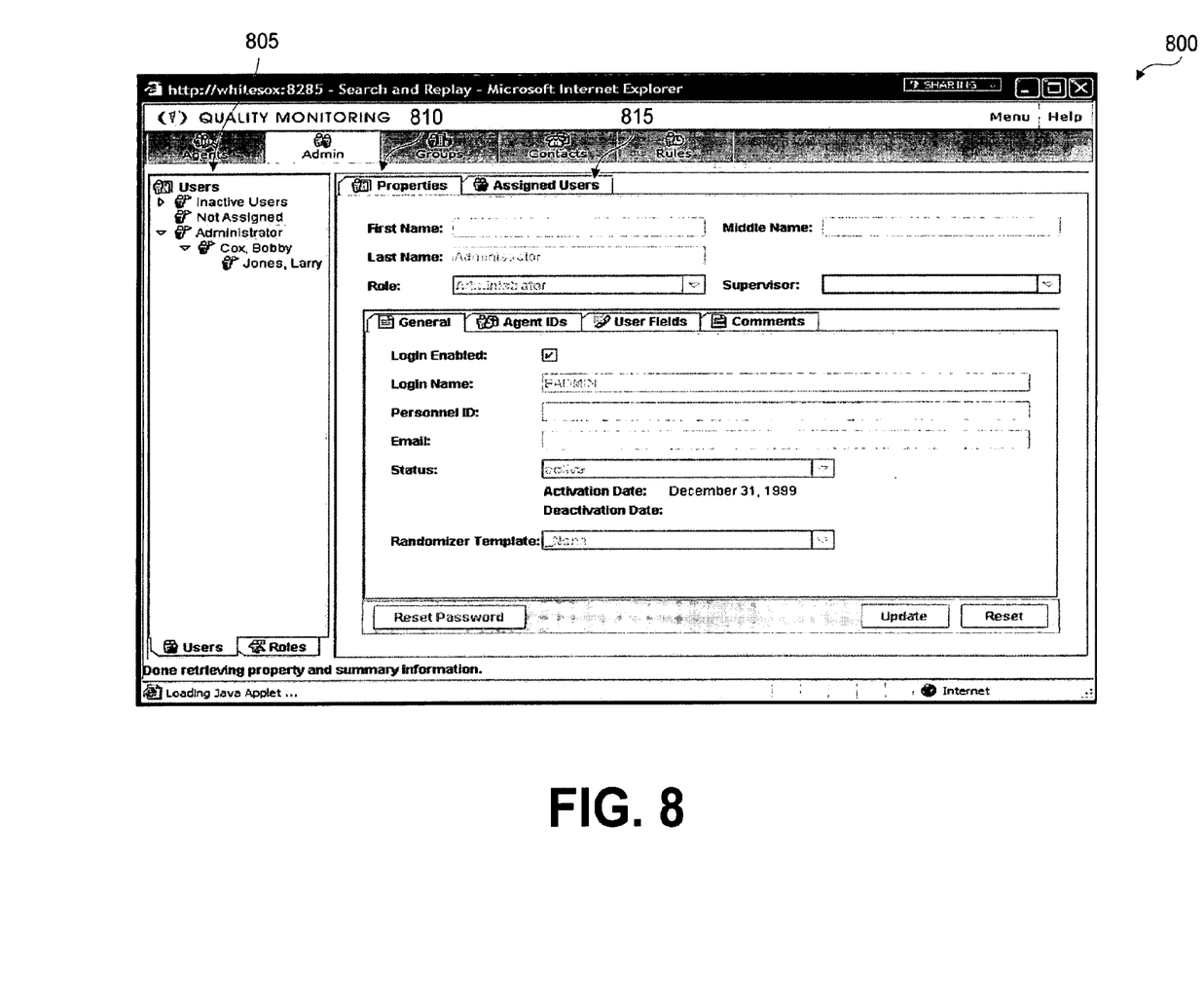
FIG. 8 is an exemplary graphical user interface illustrating agent data in quality monitoring.

FIG. 8 is an exemplary graphical user interface illustrating agent data in quality monitoring. The user graphical interface 800 depicts a user section 805 that includes a hierarchy of personnel. For example, the administrator is Bobby Cox, and Bobby Cox has an agent under him named Larry Jones.

The graphical user interface 800 further depicts a properties section 810 that includes general information about the entity in the user section 805. For example, by clicking on administrator, the general information indicates that the administrator is login enabled and provides the login name, personnel ID, e-mail address, and status (i.e., whether inactive or active), among others. The properties section 810 further includes agent IDs, user fields, and comments. An assigned user section 815 is also shown which allows the user to assign a particular agent to work group, administrator, department, or any branch within the customer center.

Figure 9:
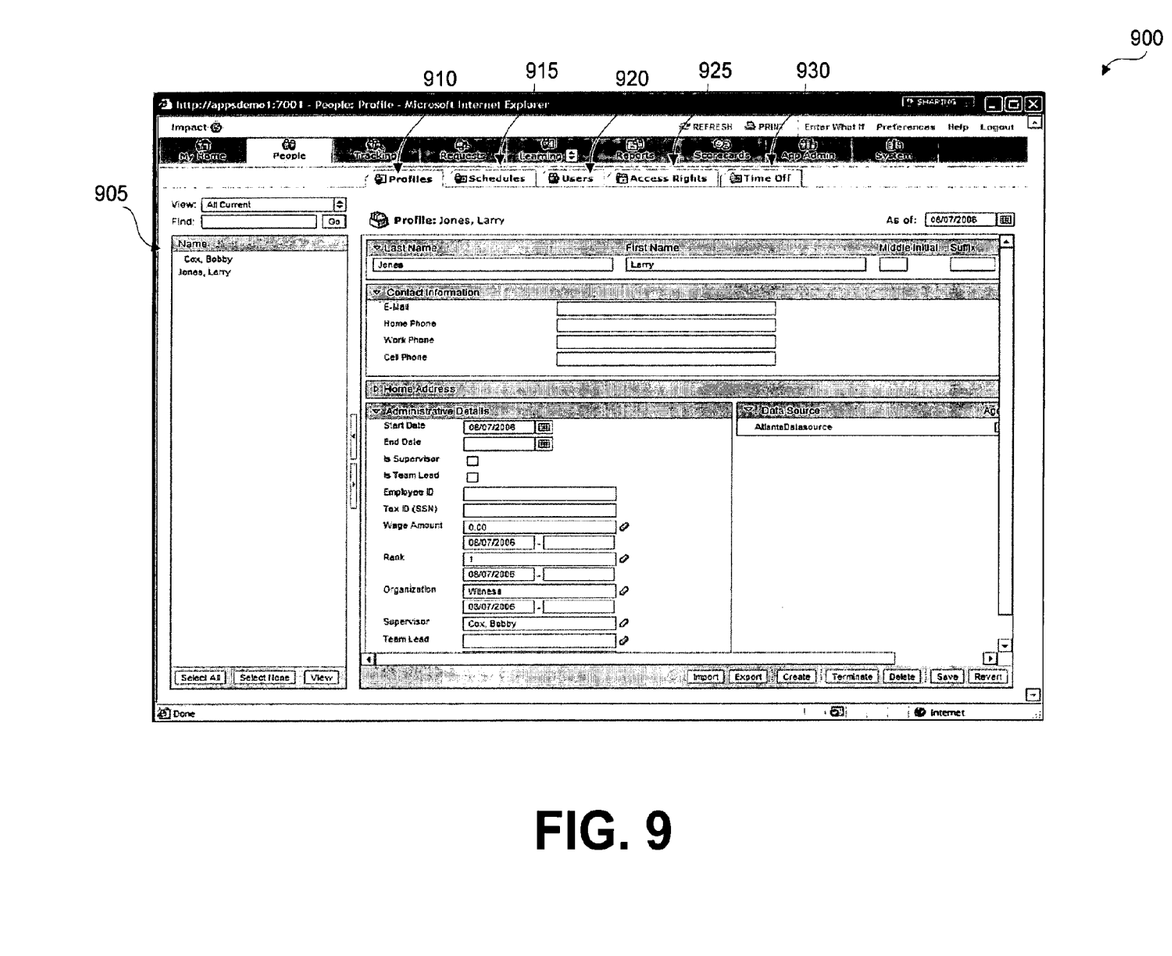
FIG. 9 is an exemplary graphical user interface illustrating a profile of an agent that can be updated.

FIG. 9 is an exemplary graphical user interface illustrating a profile of an agent that can be updated. A list of names in the name section 905 is provided. In general, the list of names includes the names of the agents that are assigned to a work group, a team, or a department within the customer center. The graphical user interface 900 further includes a profile section 910 that includes profile information related to an agent. For example, Larry Jones is selected on the name section 905 and in turn, his profile information is provided, such as, his last name, first name, contact information, home address, and administrative details, among others. Users can select schedule tab 915 to access agent schedules, users tab 920 to access agent login information, access rights tab 925 to access roles and privileges of an agent, and time off tab 930 to access the time and date that an agent has time off.

Figure 10:
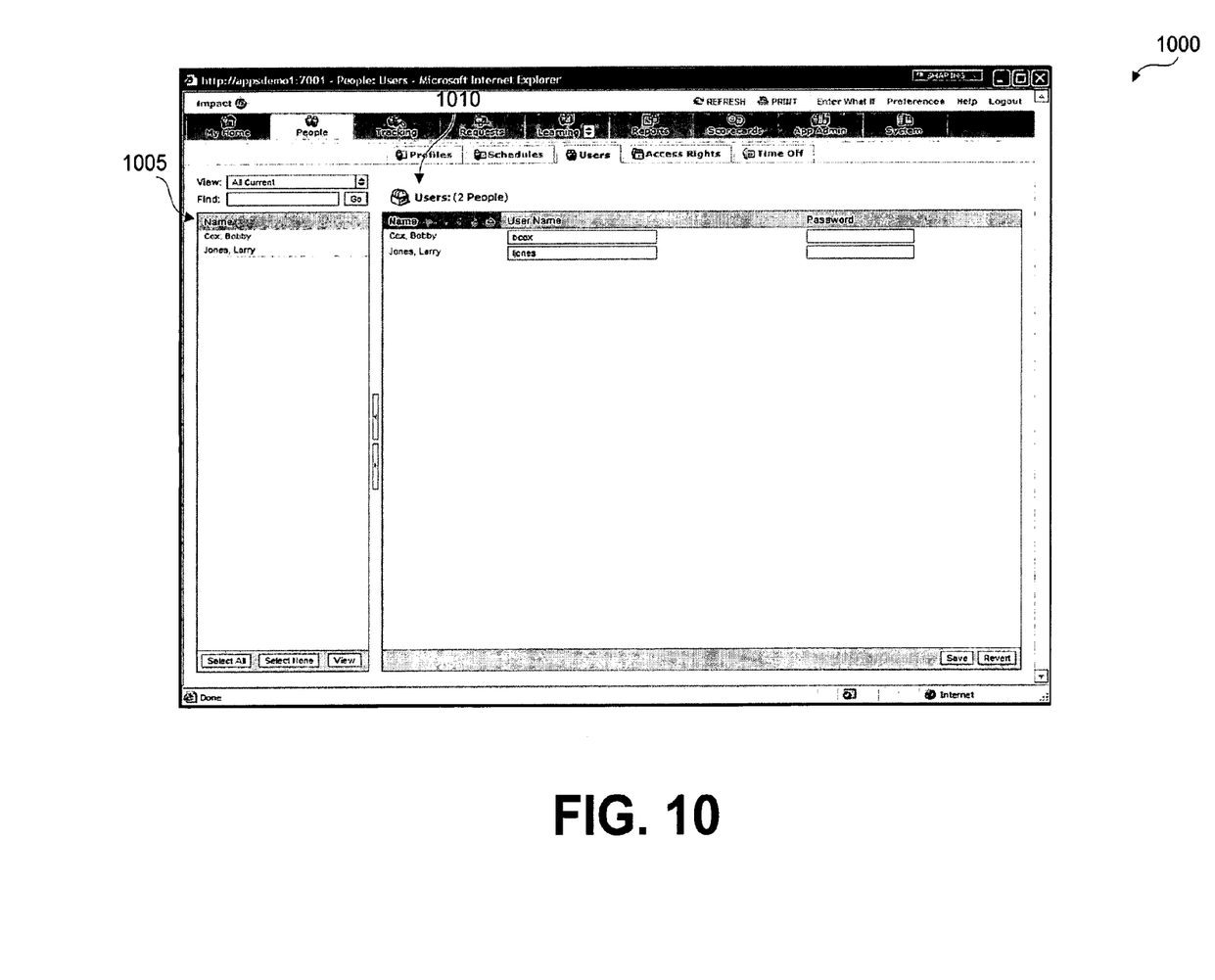
FIG. 10 is an exemplary graphical user interface illustrating username and login information of agents.

FIG. 10 is an exemplary graphical user interface illustrating the agent information contained in the users tab 920 (FIG. 9). By selecting user tab 920, graphical user interface 1000 is provided that includes a name section 1005 having the list of the names of the agents. A user section 1010 is provided that includes the agent's user name and password. The user can update, change, and/or or delete the user name and password of the agent.

Figure 11:
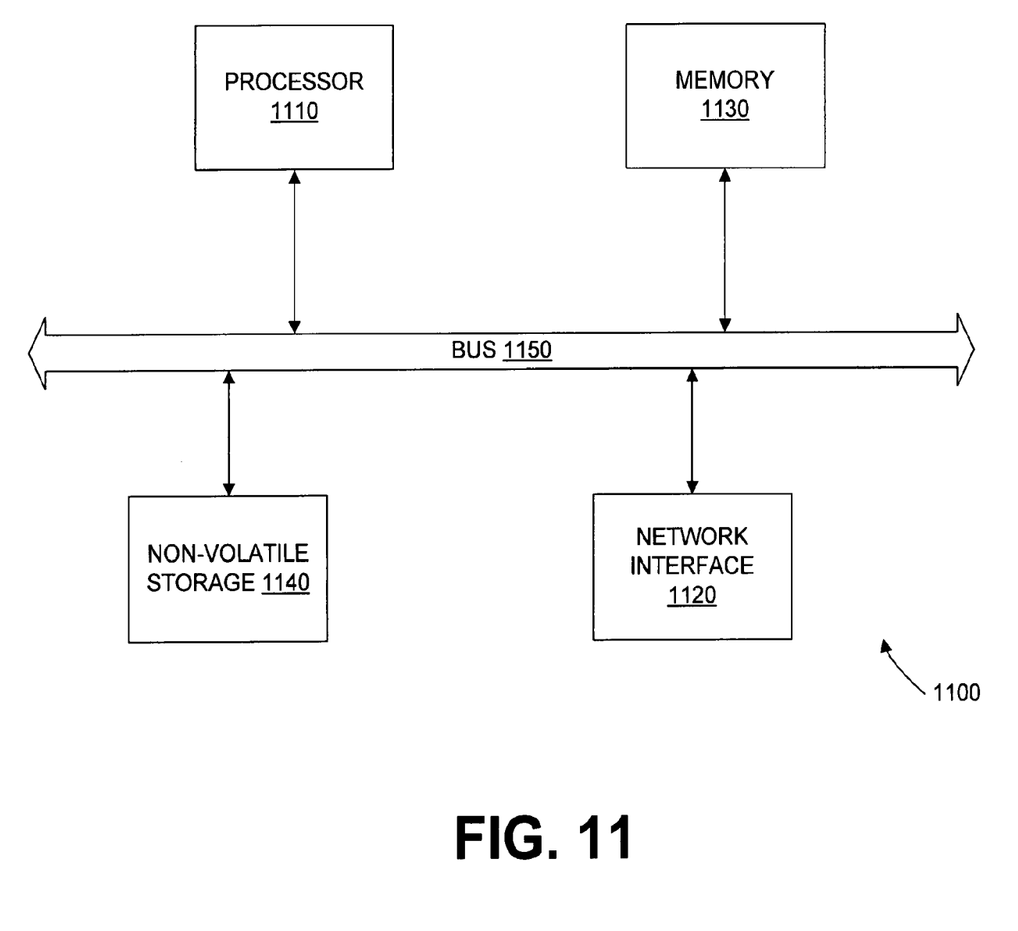
FIG. 11 is a block diagram of a general-purpose computer that can be used to implement one or more of the components of an embodiment of an integrated customer center system or process.

FIG. 11 is a hardware block diagram of a general-purpose computer 1100 that can be used to implement one or more of the components of an embodiment of an integrated customer center system, such as disclosed herein. The computer 1100 contains a number of components that are well known in the art of call center software, including a processor 1110, a network interface 1120, memory 1130, and non-volatile storage 1140. Examples of non-volatile storage include, for example, a hard disk, flash RAM, flash ROM, EEPROM, etc. These components are coupled via a bus 1150. The memory 1130 contains instructions which, when executed by the processor 1110, implement the methods and systems disclosed herein. Omitted from FIG. 11 are a number of conventional components, known to those skilled in the art that are unnecessary to explain the operation of the system 1100.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology may include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

The scope of certain embodiments of the present disclosure includes embodying the functionality of the preferred embodiments of the present disclosure in logic embodied in hardware and/or software-configured mediums.

It should be noted that the flowcharts included herein show the architecture, functionality and/or operation of implementations. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

What is claimed is:

1. A method to synchronize data in a contact center having a plurality of users, the method comprising:
identifying an initial master application of a plurality of workforce applications that are in communication with the contact center, and identifying remaining ones of the workforce applications as slave applications;
determining a substitute master application hierarchy by prioritizing the slave applications;

monitoring the initial master application to detect changes to user data, and if changes to the user data in the initial master application are detected, updating corresponding user data in the slave applications with the changes to the user data in the initial master application;

if the initial master application is unavailable, identifying one of the slave applications as a substitute master application based on the prioritization of the slave applications in the substitute master application hierarchy; and monitoring the substitute master application to detect changes to the user data, and if changes to the user data in the substitute master application are detected, updating corresponding user data in the slave applications with the changes to the user data in the substitute master application.

2. The method of claim 1 wherein the plurality of workforce applications comprise a workforce management application, a quality management application, and an enterprise reporting application.

3. The method of claim 1 wherein the initial master application comprises a workforce management application and the substitute master application comprises a quality management application.

4. The method of claim 1 wherein the user data comprises agent data.

5. The method of claim 1 wherein updating the corresponding user data in the slave applications with the changes to the user data in the initial master application comprises pushing the user data by the initial master application responsive to detecting the changes to the user data in the initial master application.

6. The method of claim 1 further comprising logging a user on to one of the workforce applications, wherein logging the user on to the one of the workforce applications results in logging the user on to additional ones of the workforce applications.

7. A synchronization manager comprising:
an instruction execution system configured to identify an initial master application of a plurality of workforce applications that are in communication with the contact center, identify remaining ones of the workforce applications as slave applications, determine a substitute master application hierarchy by prioritizing the slave applications, monitor the initial master application to detect changes to user data, and if changes to the user data in the initial master application are detected, update corresponding user data in the slave applications with the changes to the user data in the initial master application;
the instruction execution system configured to, if the initial master application is unavailable, identify one of the slave applications as a substitute master application based on the prioritization of the slave applications in the substitute master application hierarchy, and monitor the substitute master application to detect changes to the user data, and if changes to the user data in the substitute master application are detected, update corresponding user data in the slave applications with the changes to the user data in the substitute master application.

8. The synchronization manager of claim 7 wherein the plurality of workforce applications comprise a workforce management application, a quality management application, and an enterprise reporting application.

9. The synchronization manager of claim 7 wherein the initial master application comprises a workforce management application and the substitute master application comprises a quality management application.

10. The synchronization manager of claim 7 wherein the user data comprises agent data.

11. The synchronization manager of claim 7 wherein the instruction execution system configured to update the corresponding user data in the slave applications with the changes to the user data in the initial master application comprises the instruction execution system configured to push the user data by the initial master application responsive to detecting the changes to the user data in the initial master application.

12. The synchronization manager of claim 7 further comprising the instruction execution system configured to log a user on to one of the workforce applications, wherein the instruction execution system configured to log the user on to the one of the workforce applications comprises the instruction execution system configured to log the user on to additional ones of the workforce applications.

13. A non-transitory computer readable medium having a computer program stored thereon, the computer program comprising computer-executable instructions for performing the computer-implemented steps of:
identifying an initial master application of a plurality of workforce applications that are in communication with the contact center, and identifying remaining ones of the workforce applications as slave applications;
determining a substitute master application hierarchy by prioritizing the slave applications;
monitoring the initial master application to detect changes to user data, and if changes to the user data in the initial master application are detected, updating corresponding user data in the slave applications with the changes to the user data in the initial master application;
if the initial master application is unavailable, identifying one of the slave applications as a substitute master application based on the prioritization of the slave applications in the substitute master application hierarchy; and
monitoring the substitute master application to detect changes to the user data, and if changes to the user data in the substitute master application are detected, updating corresponding user data in the slave applications with the changes to the user data in the substitute master application.

14. The non-transitory computer readable medium of claim 13 wherein the plurality of workforce applications comprise a workforce management application, a quality management application, and an enterprise reporting application.

15. The non-transitory computer readable medium of claim 13 wherein the initial master application comprises a workforce management application and the substitute master application comprises a quality management application.

16. The non-transitory computer readable medium of claim 13 wherein the user data comprises agent data.

17. The non-transitory computer readable medium of claim 13 wherein updating the corresponding user data in the slave applications with the changes to the user data in the initial master application comprises pushing the user data by the initial master application responsive to detecting the changes to the user data in the initial master application.

18. The non-transitory computer readable medium of claim 13 further comprising logging a user on to one of the workforce applications, wherein logging the user on to the one of the workforce applications results in logging the user on to additional ones of the workforce applications.

* * * * *